(12) United States Patent
Durrant

(10) Patent No.: US 7,766,557 B2
(45) Date of Patent: Aug. 3, 2010

(54) EXPANDED BEAM CONNECTOR AND EXPANDED BEAM OPTOELECTRONIC DEVICE

(75) Inventor: Richard C. E. Durrant, Algonquin, IL (US)

(73) Assignee: Stratos International, Inc., Bannockburn, IL (US)

( * ) Notice: Subject to any disclaimer, the term of this patent is extended or adjusted under 35 U.S.C. 154(b) by 29 days.

(21) Appl. No.: 11/714,577

(22) Filed: Mar. 6, 2007

(65) Prior Publication Data

US 2008/0219626 A1     Sep. 11, 2008

(51) Int. Cl.
G02B 6/36 (2006.01)
(52) U.S. Cl. .......................................... 385/88; 200/296
(58) Field of Classification Search ................... 385/33, 385/59–60, 76, 84–85, 137
See application file for complete search history.

(56) References Cited

U.S. PATENT DOCUMENTS

| | | | | |
|---|---|---|---|---|
| 4,070,559 A * | 1/1978 | Piber | ............................ | 200/296 |
| 4,092,629 A * | 5/1978 | Siems et al. | ................... | 367/79 |
| 4,140,367 A * | 2/1979 | Makuch et al. | ............... | 385/59 |
| 4,156,804 A * | 5/1979 | Piber | ............................ | 200/296 |
| 4,413,907 A * | 11/1983 | Lane | ...................... | 356/139.05 |
| 4,453,747 A * | 6/1984 | Bimba | ......................... | 285/305 |
| 4,781,431 A * | 11/1988 | Wesson et al. | ................. | 385/79 |
| 4,884,861 A | 12/1989 | Nodfelt | .................... | 350/96.18 |
| 4,968,067 A * | 11/1990 | Whiteside | .................... | 285/305 |
| 5,037,199 A * | 8/1991 | Hlousek | ....................... | 356/246 |
| 5,226,837 A * | 7/1993 | Cinibulk et al. | ............. | 439/521 |
| 5,247,595 A | 9/1993 | Foldi | ............................ | 385/78 |
| 5,481,634 A | 1/1996 | Anderson et al. | ............. | 385/76 |
| 5,528,408 A * | 6/1996 | McGinley et al. | ........... | 398/139 |
| 5,546,281 A | 8/1996 | Poplawski et al. | ........... | 361/752 |
| 6,234,683 B1 | 5/2001 | Waldron et al. | ................ | 385/78 |
| 6,264,481 B1 * | 7/2001 | Kozel et al. | .................... | 439/92 |
| 6,305,849 B1 * | 10/2001 | Roehrs et al. | .................. | 385/59 |
| 6,350,063 B1 | 2/2002 | Gilliland et al. | ................ | 385/88 |
| 6,371,660 B1 * | 4/2002 | Roehrs et al. | .................. | 385/59 |
| 6,394,661 B1 * | 5/2002 | Cull et al. | ...................... | 385/59 |
| 6,431,764 B1 | 8/2002 | Scharf et al. | ................... | 385/88 |
| 6,499,890 B2 | 12/2002 | Gilliland et al. | ............... | 385/88 |
| 6,659,655 B2 * | 12/2003 | Dair et al. | ...................... | 385/92 |
| 6,778,399 B2 | 8/2004 | Medina et al. | ............... | 361/729 |

(Continued)

OTHER PUBLICATIONS

Stratos Lightwave, Inc., data sheet entitled "LxL-ST11xx Low Profile Optical Transceiver," dated Oct. 5, 2004.

*Primary Examiner*—Charlie Peng
*Assistant Examiner*—Peter Radkowski
(74) *Attorney, Agent, or Firm*—Karl D. Kovach

(57) ABSTRACT

The fiber optic connector includes a housing, a first lens, a second lens, a first ferrule, a second ferrule, a first optical fiber, a second optical fiber, an o-ring, and a clip. The housing includes a collar, a mounting portion, and a groove formed in the mounting portion. The first and second lenses, and the first and second ferrules are attached to the housing. The first and second optical fibers are attached to the first and second ferrules, respectively. The first and second lenses are in optical communication with the first and second optical fibers, respectively. The o-ring is attached to the collar. The clip is mounted to the groove formed in the mounting portion of the housing. The fiber optic connector is mountable to a backplane of a host device.

18 Claims, 4 Drawing Sheets

U.S. PATENT DOCUMENTS

| | | | |
|---|---|---|---|
| 6,913,402 B2 * | 7/2005 | Bohlin et al. | 385/93 |
| 6,952,508 B2 | 10/2005 | Simons et al. | 385/31 |
| 7,093,985 B2 * | 8/2006 | Lord et al. | 385/89 |
| 7,104,701 B1 * | 9/2006 | Durrant et al. | 385/74 |
| 7,220,062 B2 * | 5/2007 | Durrant et al. | 385/88 |
| 7,242,587 B2 * | 7/2007 | Bohlin et al. | 361/728 |
| 7,243,837 B2 * | 7/2007 | Durrant et al. | 235/375 |
| 7,350,981 B2 * | 4/2008 | Durrant et al. | 385/55 |
| 2002/0119684 A1 * | 8/2002 | Gilliland et al. | 439/76.1 |
| 2005/0163436 A1 * | 7/2005 | Bohlin et al. | 385/88 |
| 2006/0006221 A1 * | 1/2006 | Durrant et al. | 235/375 |
| 2006/0222299 A1 * | 10/2006 | Durrant et al. | 385/74 |
| 2007/0058907 A1 * | 3/2007 | Mynott et al. | 385/61 |
| 2007/0263959 A1 * | 11/2007 | Durrant et al. | 385/53 |

* cited by examiner

EXPANDED BEAM CONNECTOR AND EXPANDED BEAM OPTOELECTRONIC DEVICE

BACKGROUND OF THE INVENTION

1. Field of the Inventions

The present invention pertains to fiber optic connectors and optoelectronic devices. The invention more particularly concerns an expanded-beam, fiber optic connector, and an expanded-beam, optoelectronic device.

2. Discussion of the Background

An optoelectronic device utilizes at least one optical subassembly. The optical subassembly can be an optoelectronic receiver or an optoelectronic transmitter. An optoelectronic transmitter receives electrical signals, converts the electrical signals to light signals, and then transmits the light signals. An optoelectronic receiver receives light signals, converts the light signals to electrical signals, and then transmits the electrical signals. A transceiver is an optoelectronic device which has at least one optoelectronic receiver and at least one optoelectronic transmitter.

In order to pass optical signals through a back-plane of a host device from an optoelectronic device mounted to the host device, a fiber optic jumper cable is employed. The fiber optic jumper cable includes, in this example, two channels; however, any number of channels may be used. Two discrete optical fibers define the two channels. At a first end of the fiber optic jumper cable, the two discrete optical fibers are terminated with one type of connector. At a second end of the fiber optic jumper cable, the two discrete optical fibers are terminated with another type of connector, where the type of connector at the second end of the fiber optic jumper cable may be the same as or substantially different than the type of connector at the first end. The type of connector at the first end of the fiber optic jumper cable is compatible with the optical connector of the optoelectronic device. The type of connector at the second end of the fiber optic jumper cable is compatible with an adapter at the back-plane of the device of interest, such as a host device.

Typically, before the optoelectronic device is inserted into the host device, the connector at the second end of the fiber optic jumper cable is attached to the adapter at the back-plane. Next, while the optoelectronic device is still external to the host device, the connector at the first end of the fiber optic jumper cable is attached to the optical connector of the optoelectronic device. Then the circuit board, on which is mounted the optoelectronic device, is inserted into the host device. Thus, to accommodate the distance from the adapter, located at the back-plan, and the optoelectronic device, while the optoelectronic device is external to the host device, the fiber optic jumper cable appears to be much longer than necessary when the optoelectronic device is mounted or inserted into the host device.

Additionally, the juncture between the optoelectronic device and the connector at the first end of the fiber optic jumper cable consists of a physical contact or butt joint juncture which takes place between two mating ferrules. If the juncture at the first end of the fiber optic jumper cable and the optoelectronic device is misaligned, then the amount of optical energy transmitted between the connector at the first end of the fiber optic jumper cable and the optical connector of the optoelectronic device will be reduced and, if the optical energy is reduced enough, the structure will be rendered inoperable. Similarly, if debris, such as a spec of dust, is trapped between the connector at the first end of the fiber optic jumper cable and the optical connector of the optoelectronic device, then the amount of optical energy transmitted between the connector at the first end of the fiber optic jumper cable and the optical connector of the optoelectronic device will be reduced and, if the optical energy is reduced enough, the structure will be rendered inoperable.

Examples of various fiber optic connectors and optoelectronic devices are below presented. An example of a backplane interconnection device is set forth in U.S. Pat. No. 6,952,508. An example of a fiber optic bulkhead connector is set forth in U.S. Pat. No. 7,104,701. Examples of physical contact connectors are set forth in U.S. Pat. Nos. 5,481,634, and 6,234,683. Examples of fiber optic connectors having a lens are set forth in U.S. Pat. Nos. 4,884,861, and 5,247,595. Examples of optoelectronic devices are set forth in U.S. Pat. Nos. 5,528,408; 5,546,281; 6,350,063; 6,431,764; 6,499,890; and 6,778,399. An example of an optoelectronic device having a ball lens is set forth in U.S. Pat. No. 6,913,402. U.S. Pat. Nos. 4,884,861; 5,247,595; 5,481,634; 5,528,408; 5,546,281; 6,234,683; 6,350,063; 6,431,764; 6,499,890; 6,778,399; 6,913,402; 6,952,508; and 7,104,701 are hereby incorporated herein by reference.

Another known optoelectronic device is manufactured by Stratos International, Inc., and is disclosed in a data sheet entitled "LxL-ST11xx LOW PROFILE OPTICAL TRANSCEIVER," which is dated Oct. 5, 2004. The optoelectronic device disclosed in the data sheet has a length which is less than the length of a well known transceiver identified as a Small Form Factor (SFF) transceiver. Both the optoelectronic device disclosed in the data sheet and the SFF transceiver have optical connectors that accept the well known LC connector geometry. The LC connector geometry relies on physical contact so as to transmit, or receive, optical energy to, or from, a complementary optical connector. An LC connector is disclosed in U.S. Pat. No. 5,481,634. The optoelectronic device disclosed in the data sheet further includes a transmitting optical subassembly, a receiving optical subassembly, electrical signal conditioning components, a circuit board, an electrical connector, and a housing. The transmitting optical subassembly, the receiving optical subassembly, the electrical signal conditioning components, and the electrical connector are all electrically connected to the circuit board. The housing retains the transmitting optical subassembly, the receiving optical subassembly, the electrical signal conditioning components, and the circuit board. The housing is constructed of two pieces.

The known devices used to transmit optical signals through the back-plane of a host device utilize components that are long, such as fiber optic jumper cables, large, contain multiple optical junctures, and/or are susceptible to becoming inoperable due to a lack of optical energy being transmitted at the optical junctures.

SUMMARY OF THE INVENTION

It is an object of the invention to provide a fiber optic connector that is mountable to a back-plane of a host device.

It is a further object of the invention to provide a fiber optic connector that is less susceptible to losing optical energy.

It is another object of the invention to provide an optoelectronic device that is less susceptible to losing optical energy.

It is still another object of the invention to provide an optoelectronic device that blind mates with a fiber optic connector where the fiber optic connector is attached to the back-plane of a host device.

It is still yet another object of the invention to provide a fiber optic connector and optoelectronic transceiver that require less or smaller parts to perform their combined functions as compared to known devices.

It is yet still another object of the invention to provide an optoelectronic device that is easier to install in a host device than are known optoelectronic devices.

In one form of the invention the fiber optic connector includes a housing, a first lens, a second lens, a first ferrule, a second ferrule, a first optical fiber, a second optical fiber, an o-ring, and a clip. The fiber optic connector is mountable to a back-plane where the back-plane has an aperture, a right hand side, and a left hand side. The housing includes a collar, a mounting portion, and a groove formed in the mounting portion. The first and second lenses, and the first and second ferrules are attached to the housing. The first optical fiber is attached to the first ferrule, and the second optical fiber is attached to the second ferrule. The o-ring is attached to the collar. The clip is mountable to the groove formed in the mounting portion of the housing. The first lens is in optical communication with the first optical fiber, and the second lens is in optical communication with the second optical fiber. When the fiber optic connector is mounted to the back-plane, the mounting portion extends through the aperture of the back-plane, the o-ring is compressed between the collar and the left hand side of the back-plane, and then the clip is mounted to the groove formed in the mounting portion of the housing and contacts the right hand side of the back-plane.

In a second form of the invention the optoelectronic device includes a first cover, a second cover, a first lens, a second lens, a first lens holder, a second lens holder, a first optical subassembly, a second optical subassembly, a first circuit board, a second circuit board, flex circuitry, electrical signal conditioning components, and an electrical connector. The first lens is attached to the first lens holder. The second lens is attached to the second lens holder. The first optical subassembly is attached to the first lens holder. The first optical subassembly is in optical communication with the first lens. The second optical subassembly is attached to the second lens holder. The second optical subassembly is in optical communication with the second lens. The electrical signal conditioning components are attached to the first circuit board. The second circuit board is electrically connected to the first circuit board via the flex circuitry. The second circuit board is substantially perpendicular to the first circuit board. The second circuit board is electrically connected to the first optical subassembly and to the second optical subassembly. The electrical connector is electrically connected to the second circuit board. The first optical subassembly, the second optical subassembly, the first circuit board, and the second circuit board are retained between the first cover and the second cover.

In a third form of the invention the invention is directed to a combination of the fiber optic connector and the optoelectronic device, both as individually above described. The first lens holder and the second lens holder of the optoelectronic device are adapted to be removeably connectable to the housing of the fiber optic connector. When the first lens holder and the second lens holder of the optoelectronic device are connected to the housing of the fiber optic connector, one of the two lenses of the optoelectronic device is in optical communication with one of the two lenses of the fiber optic connector, and the second of the two lenses of the optoelectronic device is in optical communication with the second of the two lenses of the fiber optic connector.

Thus, the inventions achieve the objectives set forth above. One invention is a fiber optic connector that is mountable to a back-plane of a host device. A second invention is an optoelectronic device that is reliable since the diameter of the beam of emitted optical energy is large. A third invention is the combination of the fiber optic connector and the optoelectronic device above described in the first two inventions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
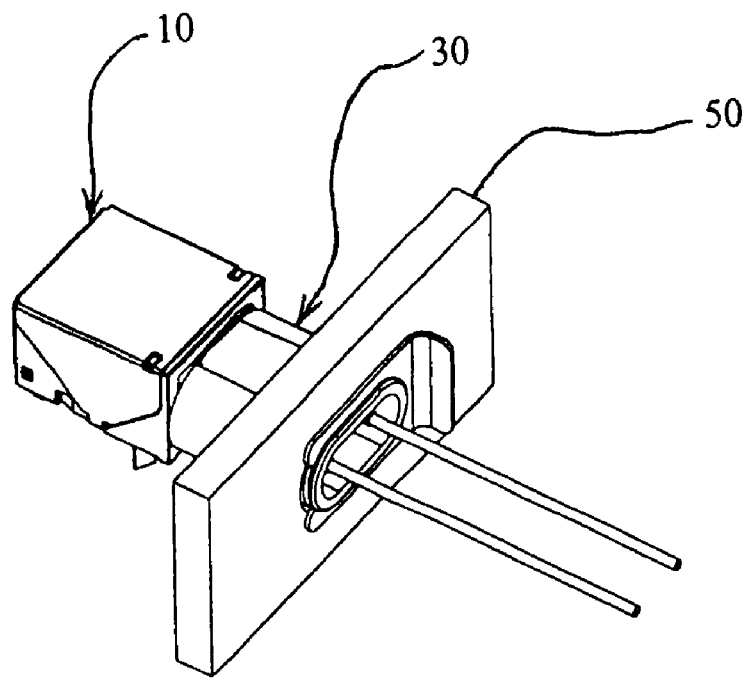
FIG. 1 is a perspective view of the expanded-beam, fiber optic connector, the expanded-beam, optoelectronic device, and the back-plane.

Referring now to the drawings, wherein like reference numerals designate identical or corresponding parts throughout the several views, and more particularly to FIGS. 1-7 thereof, embodiments of the present invention are an expanded-beam, fiber optic connector 30, an expanded-beam, optoelectronic device 10, and a combination of the expanded-beam, fiber optic connector and the expended-beam, optoelectronic device which are displayed therein.

FIG. 1 is a perspective view of the expanded-beam, fiber optic connector 30, the expanded-beam, optoelectronic device 10, and the back-plane 50. The fiber optic connector 30 is mounted to the back-plane 50 with a clip 37 (see FIG. 3). The back-plane 50 is a back-plane of host device, however, the fiber optic connector 30 can be attached to a bezel, a bulkhead or any other substrate.

Figure 7:
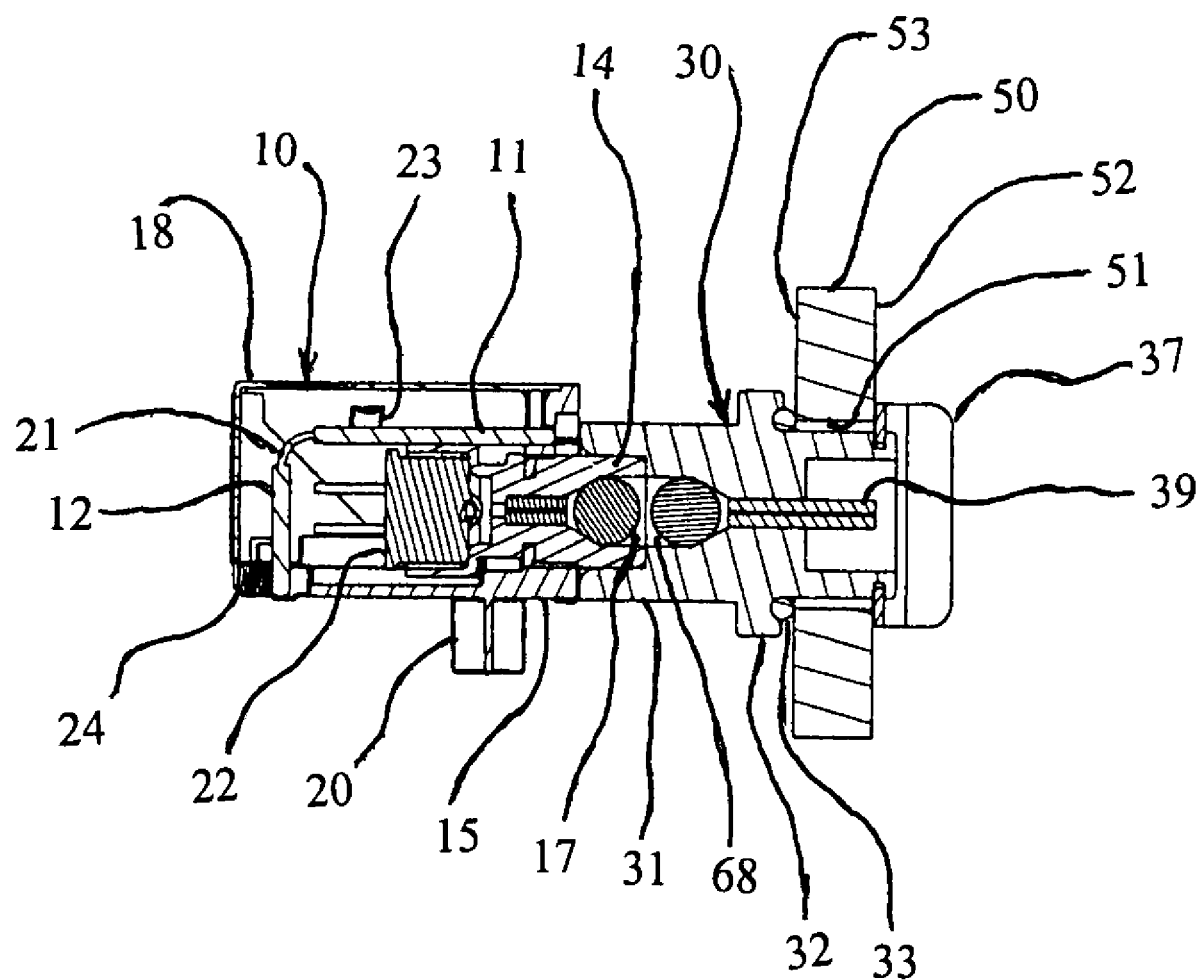
FIG. 7 is a cross-sectional, side view of the structure of FIG. 1 taken along section line 7-7 of FIG. 6.

In use, the optoelectronic device 10 is mounted to a printed circuit board (not shown) by way of the optoelectronic device's posts 20 (only one is shown, see FIG. 7). The printed circuit board is then inserted into the host device so that the optoelectronic device 10 becomes optically connected to the fiber optic connector 30 which is attached to the back-plane 50. Such a connection is known as a blind mating connection since the person inserting the circuit board into the host device is unable to observe the interconnection between the optoelectronic device 10 and the fiber optic connector 30.

Figure 2:
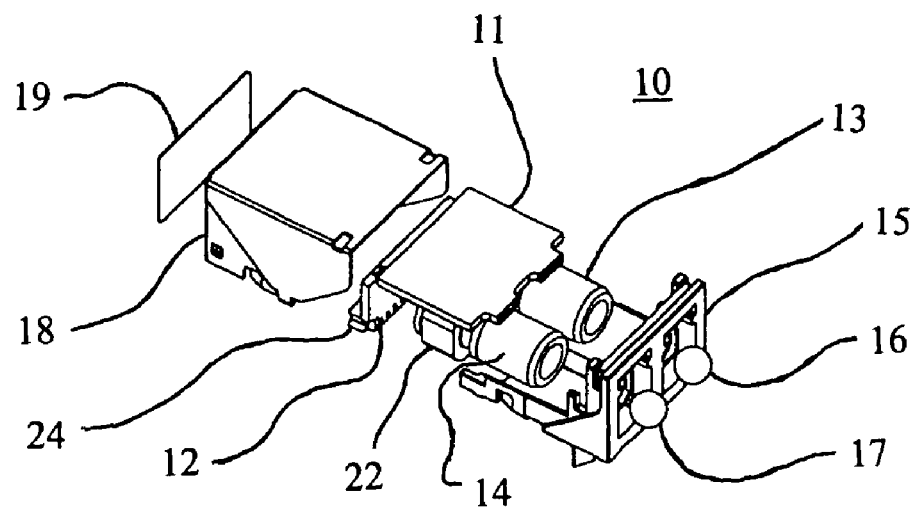
FIG. 2 is an exploded, perspective view of the optoelectronic device of FIG. 1.

FIG. 2 is an exploded, perspective view of the optoelectronic device 10 of FIG. 1. The components are more clearly shown. The optoelectronic device 10 includes a first lens holder 14, a second lens holder 13, a first lens 17, a second lens 16, a first optical subassembly 22, a second optical subassembly (not shown), a first circuit board 11, a second circuit board 12, electrical signal conditioning components 23 (see FIG. 7), flex circuitry 21 (see FIG. 7), an electrical connector 24, a bottom cover or first cover 15, a top cover or second cover 18, and a label 19. The combination of the first cover 15 and the second cover 18 form a housing.

The first lens 17 can be a spherical ball lens, and the second lens 16 can be a spherical ball lens. The first lens 17 fits into the bore of the first lens holder 14 and is retained in the bore of the first lens holder 14 by way of an optical adhesive, a retainer, a press fit, or by other means known in the art. Similarly, the second lens 16 fits into the bore of the second lens holder 13.

The first lens holder 14 is attached to and is in optical communication with the first optical subassembly 22. The first optical subassembly 22 can be a transmitting optical subassembly (TOSA) or a receiving optical subassembly (ROSA). Likewise, the second lens holder 13 is attached to and is in optical communication with the second optical subassembly (not shown). The second optical subassembly attached to the second lens holder 13 can be either one of a transmitting optical subassembly and a receiving optical subassembly. Typically, the optoelectronic device 10 will be an optoelectronic transceiver, thus requiring that one of the optical subassemblies be a transmitting optical subassembly and the other optical subassembly be a receiving optical subassembly.

The first optical subassembly 22 is electrically connected to the second circuit board 12, and the second optical subassembly is electrically connected to the second circuit board 12. The second circuit board 12 is in electrical communication with the first circuit board 11 via flex circuitry 21. The first circuit board 11 contains electrical signal conditioning components 23. The electrical signal conditioning components 23 can include a laser driver in the situation that at least one of the two optical subassemblies in a transmitting optical subassembly, and an amplifier in the situation that at least one of the two optical subassemblies is a receiving optical subassembly.

The first circuit board 11, the second circuit board 12, the first optical subassembly 22, the second optical subassembly, the first lens holder 14, and the second lens holder 13 are retained by, and within, the top cover 18 and the bottom cover 15. The top cover 18 is attached to the bottom cover 15 as is shown in FIG. 7. However, portions of the first lens holder 14, and the second lens holder 13 protrude beyond the perimeter of the bottom cover 15. The label 19 is attached to the top cover 18 by way of an adhesive. The label 19 can include information concerning eye safety and the power rating of any laser enclosed within the device 10. The top cover 18 and the bottom cover 15 are typically made of a metallic material so as to provide protection against electromagnetic interference (EMI). Additionally the electrical connector 24 is electrically connected to the circuit board 12. The electrical connector 24 can be electrically connected to a circuit board (not shown) of the host device.

Figure 3:
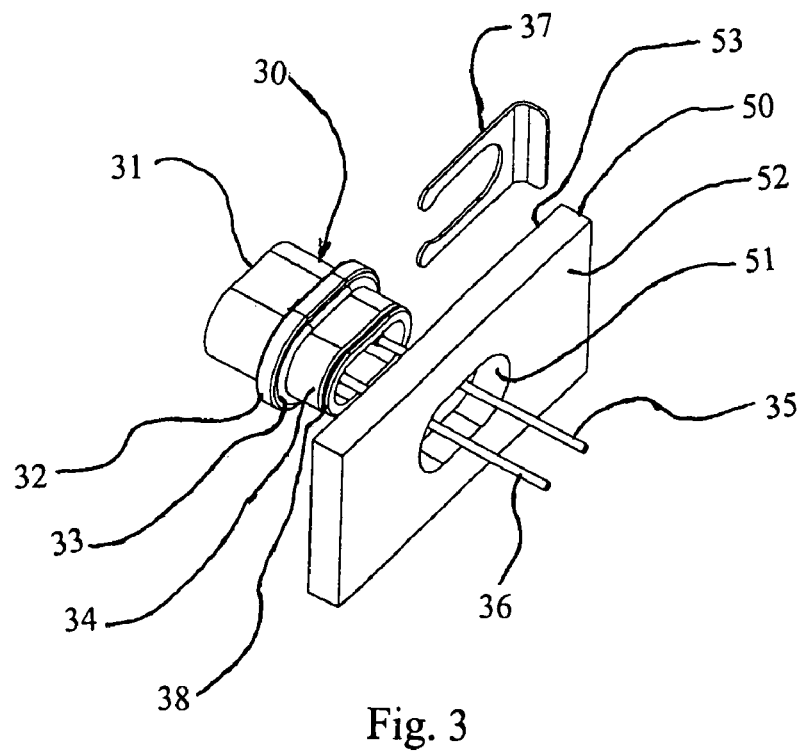
FIG. 3 is an exploded, perspective view of the fiber optic connector and the back-plane of FIG. 1.

FIG. 3 is an exploded, perspective view of the fiber optic connector 30 and back-plane 50 of FIG. 1. The fiber optic connector 30 includes a housing 31, a first lens 68 (see FIG. 7), a second lens (not shown), a first ferrule 39 (see FIG. 7), a second ferrule (not shown), and a clip 37. The housing 31 includes a collar 32, an o-ring 33 inserted into an o-ring groove formed in the collar 32, a mounting portion 34, and a groove 38 formed in the mounting portion 34. The groove 38 is designed to accept the clip 37. Also shown are a first optical fiber 36 attached to the housing 31, and a second optical fiber 35 attached to the housing 31. The first optical fiber 36 is in optical communication with the first lens 68. The second optical fiber 35 is in optical communication with the second lens. The back-plane 50 includes an aperture 51, a right hand side 52, and a left hand side 53.

The first lens 68 can be a spherical ball lens, and the second lens can be a spherical ball lens. The first lens 68 fits into a bore or aperture formed in the housing 31 and is retained in, or attached to, the bore or aperture of the housing 31 by way of an optical adhesive, a retaining clip, a press fit, or by other means known in the art. Similarly, the second lens fits into and is retained by, or attached to, the housing 31. The first ferrule 39 is retained by the housing 31, and the second ferrule is retained by the housing 31. The first optical fiber 36 is retained by the first ferrule 39, and the second optical fiber 35 is retained by the second ferrule. The first and second ferrules are retained in the housing 31 by known means, such as with an adhesive material, and the first and second optical fibers 36, 35 are retained in the first and second ferrules, respectively, by way of known means, such as with an adhesive material. The first and second optical fibers 36, 35 are not shown in FIG. 7.

Figure 4:
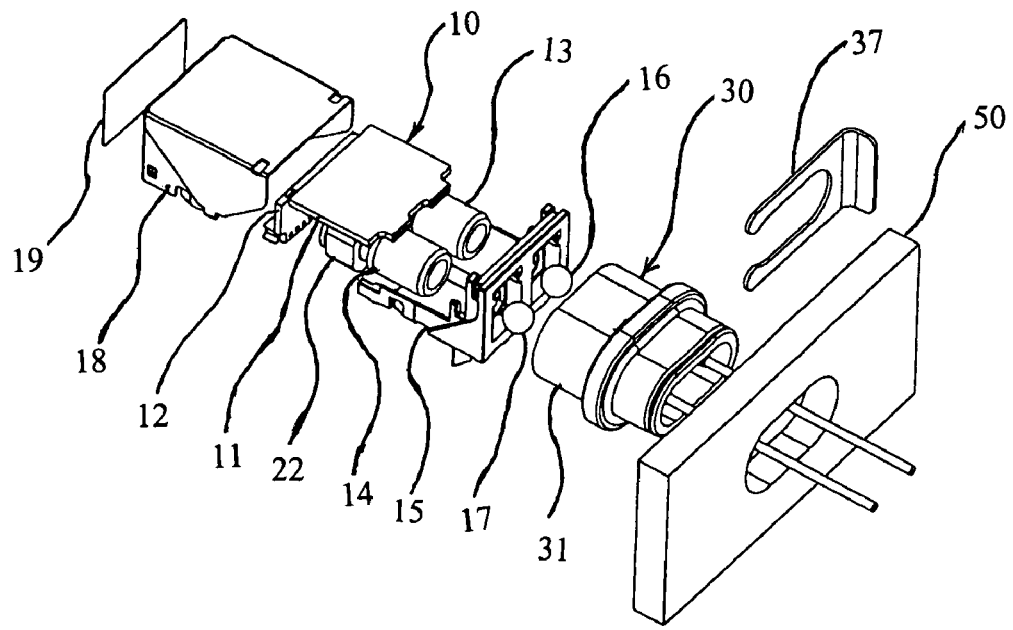
FIG. 4 is an exploded, perspective view of the optoelectronic device, the fiber optic connector, and the backplane of FIG. 1.

FIG. 4 is an exploded, perspective view of the optoelectronic device 10, the fiber optic connector 30, and the back-plane 50 of FIG. 1. The relationship of the components of the optoelectronic device 10, the fiber optic connector 30, and the back-plane 50 are more clearly shown.

Figure 5:
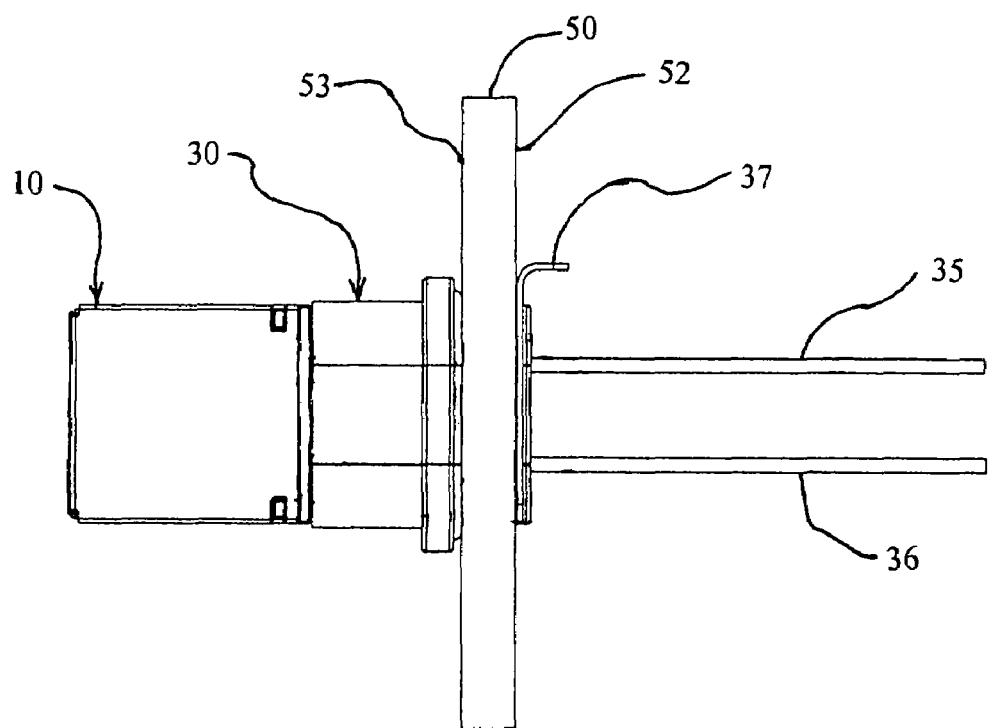
FIG. 5 is a plan view of the optoelectronic device, the fiber optic connector, and the back-plane of FIG. 1.

FIG. 5 is a plan view of the optoelectronic device 10, the fiber optic connector 30, and the back-plane 50 of FIG. 1. When the fiber optic connector 30 is mounted to the back-plane 50, an amount of the mounting portion 34 of the fiber optic connector 30 extends through or is passed through the aperture 51 of the back-plane 50 until the o-ring 33 in the collar 32 makes contact with the left hand side 53 of the back-plane 50. The housing 31 of the fiber optic connector 30 is designed so that when the o-ring 33 becomes compressed between the collar 32 and the back-plane 50, the groove 38 will be exposed on the other side of the back-plane 50. At that time, the clip 37 can be attached to the groove 38 so as to retain the fiber optic connector 30 to the back-plane 50. The clip 37 abuts the right hand side 52 of the back-plane 50. The o-ring 33 provides a seal around the aperture 51 of the back-plane 50 so as to provide a barrier between one side of the back-plane 50 and the other side of the back-plane 50. Thus, the distance between the surface of the collar 32 that contacts or nearly contacts the left hand side 53 of the back-plane 50 and the groove 38 is the same as or slightly greater than the thickness of the back-plane 50 which is measured from the right hand side 52 to the left hand side 53. Once the fiber optic connector 30 has been attached to the back-plane 50, then the optoelectronic device 10 can be blind mated to the fiber optic connector 30.

Figure 6:
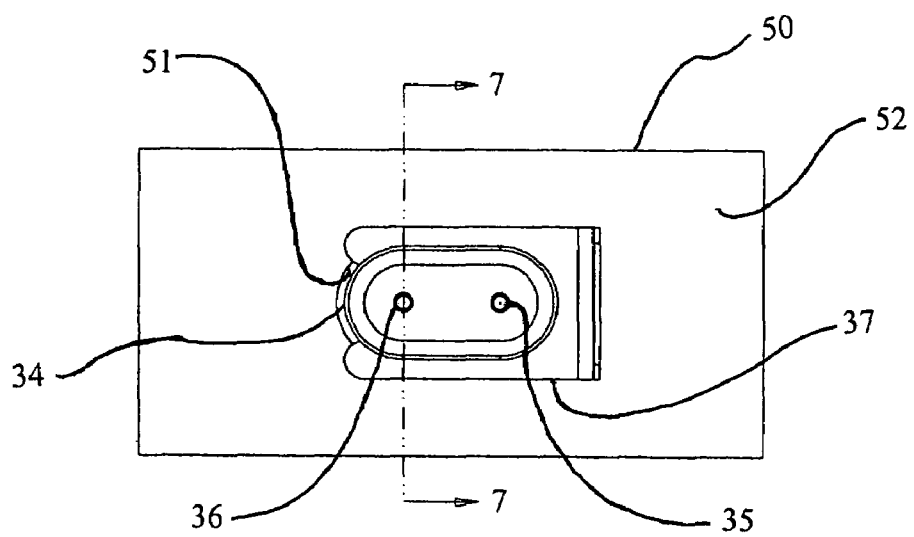
FIG. 6 is an end view of the structure of FIG. 1 taken while looking at the right-hand surface of the back-plane.

FIG. 6 is an end view of the structure of FIG. 1 taken while looking at the right hand side 52 of the back-plane 50. Shown are the aperture 51 and right hand side 52 of the back-plane 50, the clip 37, the mounting portion 34, and the first and second optical fibers 36, 35.

FIG. 7 is a cross-sectional, side view of the structure of FIG. 1 taken along section line 7-7 of FIG. 6. Shown are the interaction between the fiber optic connector 30, the optoelectronic device 10, and the back-plane 50.

As compared to known assemblies, the optoelectronic device 10 and the fiber optic connector 30 have eliminated the need for using a jumper cable and have eliminate one set of optical connections. Furthermore, the use of the ball lenses, such as lens 17 and lens 68, provides for an expanded beam light transmission between the fiber optic connector 30 and the optoelectronic device 10. Thus, if a small spec of debris is placed or trapped within the transmission path of the expanded beam light signal, the majority of the optical power will still be successfully transmitted between the two components since lens 17 is in optical communication with lens 68.

Obviously, numerous modifications and variations of the present invention are possible in light of the above teachings.

It is therefore to be understood that within the scope of appended claims, the invention may be practiced otherwise than as specifically described herein.

The invention claimed is:

1. A fiber optic connector mountable to a back-plane, where the back-plane has an aperture, a right hand side, and a left hand side, the fiber optic connector comprising:
   a housing having a collar, a mounting portion, and a groove formed in the mounting portion;
   a first lens attached to the housing;
   a second lens attached to the housing;
   a first ferrule attached to the housing;
   a second ferrule attached to the housing;
   a first optical fiber attached to the first ferrule, and wherein the first lens is in optical communication with the first optical fiber;
   a second optical fiber attached to the second ferrule, and wherein the second lens is in optical communication with the second optical fiber;
   an o-ring mounted to the collar of the housing; and
   a clip mounted to the groove formed in the mounting portion of the housing, and wherein,
   when the fiber optic connector is mounted to the back-plane, the mounting portion extends through the aperture of the back-plane, the o-ring is compressed between the collar and the left hand side of the back-plane, and the clip contacts the right hand side of the back-plane.

2. A fiber optic connector according to claim 1 wherein the housing is made of a metallic material.

3. A fiber optic connector according to claim 2 wherein the clip is made of a metallic material.

4. A fiber optic connector according to claim 3 wherein the o-ring is made of a polymer material.

5. A fiber optic connector according to claim 4 wherein the collar of the housing includes a second groove so as to partially accommodate the o-ring.

6. A fiber optic connector according to claim 5, further comprising an adhesive material attached to the first lens and the housing, the second lens and the housing, the first ferrule and the housing, and the second ferrule and the housing.

7. A fiber optic connector according to claim 6 wherein the first lens is a ball lens, and wherein the second lens is a ball lens.

8. An optoelectronic device comprising:
   a first cover;
   a second cover attached to the first cover;
   a first lens holder;
   a second lens holder;
   a first lens attached to the first lens holder;
   a second lens attached to the second lens holder;
   a first optical subassembly attached to the first lens holder, and wherein the first optical subassembly is in optical communication with the first lens;
   a second optical subassembly attached to the second lens holder, and wherein the second optical subassembly is in optical communication with the second lens;
   a first circuit board;
   electrical signal conditioning components attached to the first circuit board;
   flex circuitry;
   a second circuit board electrically connected to the first optical subassembly and to the second optical subassembly, and wherein the second circuit board is in electrical communication with the first circuit board via the flex circuitry, and wherein the second circuit board is substantially perpendicular to the first circuit board; and
   an electrical connector electrically connected to the second circuit board, and wherein
   the first optical subassembly, the second optical subassembly, the first circuit board, and the second circuit board are retained between the first cover and the second cover.

9. An optoelectronic device according to claim 8 wherein the first lens is a ball lens, and wherein the second lens is a ball lens.

10. An optoelectronic device according to claim 9 wherein the first optical subassembly is a transmitting optical subassembly.

11. An optoelectronic device according to claim 10 wherein the second optical subassembly is a receiving optical subassembly.

12. An optoelectronic device according to claim 11 wherein the first cover is constructed of a metallic material.

13. An optoelectronic device according to claim 12, further comprising an adhesive material attached to the first lens and the first lens holder, and the second lens and the second lens holder.

14. A fiber optic connector in combination with an optoelectronic device, and wherein the fiber optic connector is mountable to a back-plane, where the back-plane has an aperture, a right hand side, and a left hand side, the combination of the fiber optic connector and the optoelectronic device comprising:
   a housing having a collar, a mounting portion, and a groove formed in the mounting portion;
   a first lens attached to the housing;
   a second lens attached to the housing;
   a first ferrule attached to the housing;
   a second ferrule attached to the housing;
   a first optical fiber attached to the first ferrule, and wherein the first lens is in optical communication with the first optical fiber;
   a second optical fiber attached to the second ferrule, and wherein the second lens is in optical communication with the second optical fiber;
   an o-ring mounted to the collar of the housing;
   a clip mounted to the groove formed in the mounting portion of the housing;
   a first cover;
   a second cover attached to the first cover;
   a first lens holder;
   a second lens holder;
   a third lens attached to the first lens holder;
   a fourth lens attached to the second lens holder;
   a first optical subassembly attached to the first lens holder, and wherein the first optical subassembly is in optical communication with the third lens;
   a second optical subassembly attached to the second lens holder, and wherein the second optical subassembly is in optical communication with the fourth lens;
   a first circuit board;
   electrical signal conditioning components attached to the first circuit board;
   flex circuitry;
   a second circuit board electrically connected to the first optical subassembly and to the second optical subassembly, and wherein the second circuit board is in electrical communication with the first circuit board via the flex circuitry, and wherein the second circuit board is substantially perpendicular to the first circuit board; and
   an electrical connector electrically connected to the second circuit board, and wherein
   when the fiber optic connector is mounted to the back-plane, the mounting portion extends through the aperture of the back-plane, the o-ring is compressed between the collar and the left hand side of the back-plane, and the clip contacts the right hand side of the back-plane, and wherein the first optical subassembly, the second optical subassembly, the first circuit board, and the second circuit board are retained between the first cover and the second cover, and wherein the first lens holder and the second lens holder are adapted to be removeably connectable to the housing, and wherein when the first lens holder and the second lens holder are connected to the housing, the first lens is in optical communication with the third lens, and the second lens is in optical communication with the fourth lens.

15. A combination of a fiber optic connector and an optoelectronic device according to claim 14 wherein the first lens is a ball lens, the second lens is a ball lens, the third lens is a ball lens, and the fourth lens is a ball lens.

16. A combination of a fiber optic connector and an optoelectronic device according to claim 15 wherein the first optical subassembly is a transmitting optical subassembly.

17. A combination of a fiber optic connector and an optoelectronic device according to claim 16 wherein the second optical subassembly is a receiving optical subassembly.

18. A combination of a fiber optic connector and an optoelectronic device according to claim 17 wherein the first cover is constructed of a metallic material.

* * * * *